United States Patent [19]
Futamura

[11] B 3,985,826
[45] Oct. 12, 1976

[54] HYDROGENATED BLOCK COPOLYMERS OF BUTADIENE AND ISOPRENE

[75] Inventor: Shingo Futamura, Seville, Ohio

[73] Assignee: The Firestone Tire & Rubber Company, Akron, Ohio

[22] Filed: May 8, 1975

[21] Appl. No.: 575,851

[44] Published under the second Trial Voluntary Protest Program on February 10, 1976 as document No. B 575,851.

Related U.S. Application Data

[63] Continuation-in-part of Ser. No. 484,486, July 1, 1974.

[52] U.S. Cl. .................... 260/876 B; 260/878 R; 260/878 B; 260/879
[51] Int. Cl.² .................... C08F 15/04; C08F 15/40
[58] Field of Search ............. 260/879, 878 R, 876 B

[56]  References Cited
UNITED STATES PATENTS 3,452,118   6/1969   Winkler et al. .................... 260/879
3,465,063   9/1969   Hassell et al. .................... 260/876

*Primary Examiner*—William F. Hamrock

[57] ABSTRACT

The products disclosed herein involve hydrogenated butadiene-isoprene block copolymers having at least five alternating blocks of the two respective monomers. Such hydrogenated block copolymers have an improved permanent set or lower residual strain as compared to similar hydrogenated block copolymers having only three such alternating blocks. Moreover, a milled product made from such material has a much improved smoothness of surface. These new products are particularly useful in making rubber hose, shoe soles, etc. and are also useful for blending with polyolefins, such as polyethylene, to improve the impact resistance of polyolefin resins without sacrifice of rigidity.

11 Claims, No Drawings

HYDROGENATED BLOCK COPOLYMERS OF BUTADIENE AND ISOPRENE

This application is a continuation-in-part of application Ser. No. 484,486, filed July 1, 1974.

BACKGROUND OF THE INVENTION

1. Field of The Invention

This invention relates to hydrogenated block copolymers of butadiene and isoprene. More specifically, this invention relates to such copolymers having at least five alternating blocks of the respective monomers.

2. Related Prior Art

Block copolymers of alpha-olefins have been produced by the periodic injection of several types of alpha-olefins resulting in block copolymers having properties somewhat different from random copolymers achieved by polymerization of mixtures of the two monomers. However, the products so obtained are either those of the thermoplastic type or of the elastomeric type requiring vulcanization to achieve their maximum stress strain properties.

Vulcanization of alpha-olefin polymers presents numerous problems which have not been satisfactorily solved at the present time. While vulcanization is possible, the vulcanization recipes are either elaborate or expensive or the products so produced have exceedingly bad odor, and other disadvantages are usually encountered.

It would be of special benefit to obtain an alphaolefin polymer having optimum elastomeric properties without the necessity of vulcanizing and at the same time a "self-vulcanizing" rubber which has a minimum of unsaturation, thus promoting its thermal and oxidative stability. Up to the present time, however, such products have not been obtained, either due to the lack of proper relationship of the individual alpha-olefin blocks within a given block copolymer, or to the solubility properties encountered during the polymerization process itself.

British Patent No. 1,160,234 describes the preparation of elastomeric block copolymers having the properties of a self-curing elastomer which has the general formula A—B—A wherein each polymer block A is an independently selected homopolymer block of an alpha-mono-olefin having 2 to 8 carbon atoms per molecule, each block A having an average molecular weight between 8,000 and 100,000 and preferably between 10,000 and 75,000, and B is an elastomeric copolymer block of at least two alpha-mono-olefins, having an average molecular weight between 35,000 and 500,000, and preferably between 40,000 and 350,000, the total block A content being between 10 and 50% by weight, preferably between 12 and 40% by weight of the block copolymer.

The patent describes the preparation of such saturated block copolymers from diene block copolymers having the structure C-D-C wherein each C represents a block of butadiene-1,3 homopolymer and D represents a homopolymer block of an alkyl-substituted conjugated diene such as isoprene. The C content is between 10 and 50% of the copolymer, and eventually at least 90% of the double bonds of the block copolymer are hydrogenated.

Specifically, a suitable starting block copolymer is described as polybutadiene-polyisoprene-polybutadiene. The block copolymer is then substantially completely (i.e. at least 90%) hydrogenated to provide essentially saturated block copolymers wherein the blocks A are not only saturated but are essentially non-elastomeric, while the block B is both saturated and elastomeric.

However, block copolymers having the three alternating blocks described above do not have satisfactory permanent set or low enough residual strain and upon milling do not give the desired smooth surface.

SUMMARY OF THE INVENTION

In accordance with the present invention it has been found that the permanent set properties and the smoothness upon milling are improved when block copolymers have at least five block segments, instead of three, of butadiene and isoprene followed by hydrogenation to at least 90% saturation of the double bonds therein. While it is preferred for certain purposes to have 100% isoprene in the isoprene blocks, these hydrogenated isoprene blocks retain their elastomeric or rubbery character even when as much as 50% by weight of hydrogenated butadiene is in these blocks. For equivalent total molecular weights and percentages of the respective copolymers it is found that the distribution of the monomers in 5–15, preferably 5–11, alternating blocks effects improvements in the resultant hydrogenated copolymers. While copolymers having more than 15 blocks may be used with the improvements noted for this invention, the use of additional blocks does not give any added advantage over the use of 15 blocks and advantageously over the use of 11 blocks.

While it is generally preferred to have terminal blocks of butadiene it is also within the scope of this invention to have one or both terminal blocks of isoprene. In these copolymers there is 5–70% of the repeating units derived from butadiene and the balance from isoprene. The various blocks have molecular weights depending on the number of blocks and on the overall molecular weight.

The conjugated diene block copolymers are preferably prepared by one of two methods. These may be described as "sequential" on the one hand or as "coupling" on the other. Each of these methods involves the same initial stages: Butadiene is subjected to solution polymerization in the presence of a lithium based catalyst, such as a lithium alkyl. Polymerization is conducted to the point where the first polymer block is formed, after which, without termination of the growing polymer chains, a branched chain conjugated diene is injected and polymerization is continued. In the sequential process, polymerization is conducted until the desired molecular weight of the entire second block is formed, after which butadiene is injected in the system and the third polymer block is formed. This technique is repeated until the desired number of blocks have been added, that is five or more. If, however, the coupling process is involved, the polymerization of the branched chain conjugated diene block which is to be the central block of the ultimate copolymer is conducted until the molecular weight is only about one half of that desired, after which a coupling agent such as a dihalohydrocarbon, divinyl aromatic hydrocarbon or carbon monoxide is injected in the system to couple the intermediate block copolymer. The products obtained by either process have the general configuration B—I—B—I—B or higher as described herein wherein B represents a butadiene block and I represents an isoprene block.

The block polymers so obtained are then subjected to hydrogenation. In order to be most effective, it is necessary to hydrogenate at least about 90% of the double bonds in the original block copolymer and preferably in excess of about 95%. These will be referred to in the specification and claims as "essentially saturated" block copolymers. Any suitable method of hydrogenation may be used.

The block copolymerization is conducted in the presence of a hydrocarbon solvent which is essentially inert under the conditions of the polymerization. Alkanes and cycloalkanes, such as hexane, cyclohexane or other saturated hydrocarbons having from 4 to 10 carbon atoms per molecule are preferred solvents for this purpose. Aromatic solvents, benzene, toluene, etc., also can be used as well as some chlorinated alkanes and cycloalkanes. The catalysts utilized in preparing the block copolymers are advantageously alkyl lithium catalysts known to the art. Branched and straight chain alkyl lithium compounds may be used. Typical examples thus include n-butyl lithium and other alkyl lithiums such as propyl lithium, isobutyl lithium and amyl lithium. While alkyl lithium catalysts are preferred, various other catalysts may be used which will permit the formation of block copolymer segments as described herein.

The polymerization is conducted under conditions which will avoid inadvertent termination of the growing polymer-chain. This temperature range is usually between about 0°C and 150°C., the preferred range being between about 40°C and 130°C and at pressures ranging from subatmospheric to 100 atmospheres, more particularly atmospheric to 5 atmospheres. Catalyst and monomer concentrations are not critical and are preferably from 0.01 to 10 millimoles of alkyl lithium per mole of monomer, and monomer concentrations, based on total weight in the feed stream, are of 0.5 to 90 weight percent or more, or the monomer may be used without diluent.

Where, in the present specification and claims, reference is made to average molecular weight, this is based upon intrinsic viscosity measurements. As indicated above in order to achieve self-curing properties of the desired end product, it is necessary to allow polymerization to form block B only to the range of an average molecular weight between about 1,000 and 100,000, preferably between about 2,000 and 50,000. The isoprene blocks are also advantageously in these same molecular weight ranges. If the average molecular weight of each block B is outside of the specified range, the properties of the polymer are drastically altered.

Polymerization is therefore continued until the specified average molecular weight of the first block B is achieved, after which the monomer (if any remains) is swept out and/or replaced by the isoprene to be utilized in the formation of the elastomeric block I. Preferably the amount of monomer is added each time to give the desired molecular weight equivalent for that block and polymerization is continued until all the monomer is used.

Thereafter, the second block is created by sweeping out any remaining block B (butadiene) monomer, and then adding block I (isoprene) monomer. Block copolymerization is continued as described hereinbefore to form the desired average molecular weight equivalent, this being within the range specified. This procedure is continued until at least five blocks have been formed.

After the polymerization has proceeded to the desired extent, the resultant cement may be used as such in a hydrogenation treatment, or the diene block copolymer may be isolated by any standard technique such as by a slurry operation wherein the reaction solution is run into a reactor containing hot water to flash off unreacted monomer, terminate polymerization, and afford a slurry of the polymeric product which is then filtered and the product dried in conventional drying equipment. Alternatively, the reaction mixture may be introduced into a hot aromatic or aliphatic hydrocarbon solvent to flash off unreacted monomer and terminate polymerization. The resulting polymer-containing solution may then be isolated by passing it into a vacuum chamber where the solvent is evaporated or flashed off. This technique affords strands or pellets of the polymer. Or the polymeric solution may simply be dumped into a large volume or methanol or isopropanol to kill the catalyst and precipitate the polymer. If desired an antioxident may be present in such diluent.

In the hydrogenation step any catalyst may be used which is capable of converting aliphatic unsaturation to saturated product. Numerous catalysts are known for this purpose and one particularly suited to the present purpose is nickel.

The concentration of hydrocarbon polymers to be hydrogenated may be from 1 to 30%, preferably from 1 to 20% by weight. As shown in the examples, excellent hydrogenation efficiency is obtained by hydrogenation of a solution containing 10–20% of the block copolymers carried out at room temperature to 150°C, preferably room temperature to 130°C, under hydrogen pressure from 1 atmosphere to 100 atmospheres, preferably 2–20 atmospheres.

After the hydrogenation, removal of solvent and catalysts from the hydrogenated hydrocarbon polymers is easily carried out by adding polar solvent such as acetone and alcohol to the reaction mixtures and precipitating the polymers, or by pouring the reaction products into hot water and removing solvent by azeotropic distillation. In these procedures, catalysts are decomposed and the major part of them is removed from the polymers, but the most effective removal of the catalysts is attained by contacting the reaction mixtures with a polar solvent containing a small amount of acid.

The butadiene unit has the formula
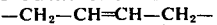
and/or

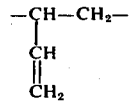

the hydrogen-saturated butadiene unit has the formula
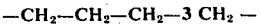
and/or

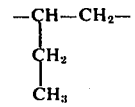

The isoprene unit has the formula

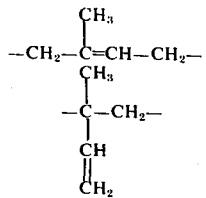

and/or

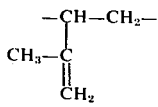

The hydrogen-saturated isoprene units have the formula

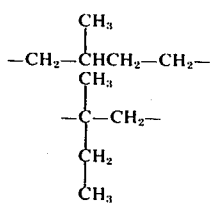

and/or

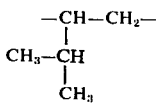

The present invention preferably provides hydrocarbon high copolymers consisting of butadiene units and hydrogen-saturated butadiene units, the butadiene unit being at least 75 percent of 1,4-addition type, preferably 85 percent or more.

The hydrogenated block copolymers of this invention may be utilized for a wide variety of molding operations utilizing apparatus normally employed for the molding of thermoplastics particularly for making rubber hose, shoe soles, tires, industrial and automobile goods, etc. The copolymers may be modified with flow assisting agents. It is preferred, however, to restrict the proportions of these agents so as to maintain maximum stress-strain properties in the finished compositions. Fillers may be employed if desired such as those utilized with ordinary rubbers. They may be further modified by the presence of asphalt, wax, polyvinyl compounds such as polystyrene, ordinary polymers of alpha-olefins such as polypropylene or polyethylene or may be mixed with either natural or synthetic rubbers such as polyisoprene or polybutadiene.

As indicated above it has been found that the block copolymers of this invention in which there are at least 5 blocks have superior properties in a number of respects as compared to similar hydrogenated block copolymers of similar molecular weight and proportions of comonomers where there are no more than 3 blocks. Generally it is preferred that there are at least 7 blocks in these copolymers. As previously stated there is generally no added advantage in using more than 15 blocks and very often no great advantage in exceeding 11 blocks. In particular it is found that the increased number of blocks produces a reduction in the amount of residual strain resulting from stretching, and this results in less creep when the polymer is stretched.

Moreover, it is found that the impact resistance of polyolefins, such as polyethylene, polypropylene, etc., may be improved without sacrifice of rigidity in the original polyolefin polymer by blending therewith a hydrogenated block copolymer of this invention. Polyolefins having molecular weights of 5,000–1,000,000 or higher are improved by this blending. Furthermore because of the similarity in structure these hydrogenated block copolymers are highly compatible with the polyolefins.

In such blends the hydrogenated block copolymer may advantageously represent 5–90 percent of the combined weight of polymers or preferably 15–60 percent. In most cases it is found that the impact strenths are improved by at least 100% by the addition of the hydrogenated block polymers of this invention.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A block copolymer is prepared from butadiene and butyl lithium as the catalyst. The initial polymer block is formed by polymerizing butadiene in the solvent in the presence of the catalyst to form a block having an average molecular weight of about 25,000. Without further treatment of the polymer so formed, isoprene is added and polymerization continued at about 50°C to form the intermediate block copolymer having the configuration polybutadiene-polyisoprene-Li. Without further treatment of the intermediate, butadiene is introduced and polymerization continued until the three-block copolymer having the structure polybutadiene-polyisoprene-polybutadiene is formed the average molecular weights of the individual blocks being 25,000–100,000–30,000. The procedure is continued for the addition of two more blocks so that the ultimate block copolymer B—I—B—I—B has individual block molecular weights of 25,000–100,000–30,000–100,000–25,000. This copolymer is deactivated by the addition of sufficient isopropanol to neutralize the lithium and the polymer is precipitated by pouring the reaction solution into a large volume of methanol.

EXAMPLE II

The procedure of Example I is repeated with appropriate modifications in proportions and the number of block formation steps to prepare a 7 block copolymer of the formula B—I—B—I—B—I—B having individual block molecular weights of 20,000–65,000–20,000–70,000–20,000–65,000–20,000.

EXAMPLE III

Butadiene is polymerized in cyclohexane solvent at 50°–55°C utilizing butyl lithium catalyst to form the initial polybutadiene block, after which isoprene is introduced and polymerization continued to form the intermediate block copolymer-polybutadiene-polyisoprene-Li. Then additional butadiene is added and polymerization continued to give polybutadiene-polyisoprene-½-polybutadiene wherein ½-polybutadiene means a polybutadiene block having a molecular weight of only ½ that desired in the center block of the ultimate coupled copolymers. Dibromethane is then introduced into the reaction mixture and coupling immediately takes place to form a coupled product having essentially the same structure as the five block copolymer formed in accordance with Example I.

and smoother surfaces for the 5, 7 and 11 block copolymers:

| Copolymer | Tg | Tm | Modulus (psi) 10% | Modulus (psi) 100% | Tensile (psi) | Elong. % | Residual Strain (ASTM D1566) 100% Elong. | Surface of Milled Sheet | Swelling in Toluene after 24 hours |
|---|---|---|---|---|---|---|---|---|---|
| BI | −59 | +101 | 280 | 600 | 1860 | 760 | 16.4 | Very Rough | 72% |
| BIB | −59 | + 99 | 275 | 600 | 2000 | 745 | 10.2 | Rough | 70% |
| BIBIB | −60 | + 98 | 300 | 575 | 1750 | 785 | 7.8 | Fair | 69% |
| BIBIBIB | −60 | + 96 | 300 | 600 | 1855 | 720 | 7.0 | Smooth | 63% |
| BIBIBIBIB | −60 | + 97 | 300 | 640 | 2010 | 740 | 7.0 | Smooth | 64% |

EXAMPLE IV

Hydrogenation of the polymer prepared by the process according to Example I is effected in the presence of a catalyst prepared by contacting nickel acetate with aluminum triethyl, in a molar ratio of 1.5/1 aluminum/nickel. The catalyst components are heated in cyclohexane for 30 minutes at 130°C. An amount of catalyst sufficient to provide 1% weight of reduced nickel based on the polymer is suspended in a cyclohexane solution of the polymer, the solution containing 14% by weight of the latter. The reactor is pressured to 1500 psig with hydrogen and heated to a maximum of 140°C with vigorous stirring. The total reaction time is 140 minutes (120 minutes above 130°C). Absorption of hydrogen takes place immediately and is probably completed within 30 min.

The final reaction pressure at 140°C is 1120 psig. The product is essentially completely hydrogenated and has the configuration of a polymer of polyethylene-poly(ethylene-propylene)-polyethylene-poly(ethylene-propylene)-polyethylene. The hydrogenated polymer is soluble in hot benzene.

EXAMPLE V

A series of block copolymers of butadiene and isoprene are prepared using the technique of Example I with appropriate modifications to give the indicated number of blocks, namely 2, 3, 5, 7 and 11. In each case the total amount of butadiene used represents 60% of the ultimate copolymer and the isoprene represents 40% of the ultimate copolymer molecular weight. The ultimate copolymers each have approximately the same total molecular weight and each monomer is divided equally among the number of its type of blocks. Thus in BI, all of the butadiene is in one block and all of the isoprene is in one block. In BIB the butadiene is divided equally between two blocks. In BIBIB, the butadiene is divided equally between three blocks and the isoprene equally between two blocks. In BIBIBIB, the butadiene is divided equally between four blocks and the isoprene between three blocks. In BIBIBIBIB, the butadiene is divided equally between six blocks and the isoprene between five blocks. Each of the copolymers is hydrogenated by the procedure of Example VII to 100% saturation. Various tests are performed on the hydrogenated product with the following tabulated results showing definite superiority in residual strain

EXAMPLE VI

A block copolymer is prepared from butadiene and isoprene using a temperature range of 130°–175°F (55°–80°C). A blend of 40% butadiene and 60% hexane is used for the butadiene blocks and a blend of 25% isoprene and 75% hexane is used for the isoprene blocks. For the first B (butadiene) block 10 lbs. of the butadiene blend and 8.1 gms. (or 130 millimoles) of n-BuLi are charged to the reactor. This is polymerized at 130°F for 25 minutes. Then 15 lbs. of the isoprene blend is charged and polymerized at 135°–175°F for 15 minutes following which 10 lbs. of the butadiene blend is added and polymerized at 175°–150°F for 25 minutes. Then the second block of isoprene is formed by adding 15 lbs. of the isoprene blend and polymerizing at 150°F for 30 minutes. The third B block is next formed by adding 10 lbs. of the butadiene blend and polymerizing at 148°F for 33 minutes. Next the third I block is formed by adding 15 lbs. of the isoprene blend and polymerizing at 166°F for 42 minutes. The fourth B and last block is attached by adding 10 lbs. of the butadiene blend and polymerizing at 155°F for one hour and then cooling. Samples are taken for analysis and the cement product (RP-8286) is transferred to another reactor for hydrogenation as described in Example VII. The total solids is 29.2%. The molecular weight of the total block copolymer is 92,000 number average and 152,000 weight average, with each B block being about 14,000 and each I block about 12,000 number average.

EXAMPLE VII

Five gallons of the block copolymer cement product from Example VI containing about 2500 gms. of polymer is charged to a hydrogenation reactor together with an additional 40 lbs. of dry hexane. The reactor is flushed 6 times by pressuring to 50 psig with hydrogen and then releasing the pressure to about 5 psig. Then the hydrogenation catalyst is added which comprises 25 millimoles of Ni in nickel octoate-cyclohexene-triethyl aluminum in proportions of 1/⅓ respectively. The temperature is raised to 130°F and hydrogen introduced to a pressure of 150 psig. Periodically the system is repressured to 150 psig and samples are removed three times at several hours intervals. The temperature is maintained at 130°–160°F over a period of about 7 hours after which the reaction mixture is cooled to 120°F and vented several times. The product is dropped into a 55 gallon drum containing methanol and a small amount of antioxidant (dibutyl-p-cresol) to provide about 0.5 gm. of A.O. per 100 gms. of polymer. The product is filtered and rinsed several times with hexane. The copolymer is found to be about 100% hydrogenated and to have a glass transition temperature of −59°C and a melting point of 97°C. This product shows excellent impact strength and is used in the tests of Example VIII.

As indicated above the hydrogenated block copolymers of this invention give surprisingly effective improvements in impact strengths when blended with polyolefins. The proportions are advantageously 5–60%, preferably 10–30 percent of hydrogenated block copolymers based on combined weight of said copolymer and polyolefin.

EXAMPLE VIII

A number of blends are prepared by milling together various proportions of the hydrogenated block copolymer prepared in Examples VI and VII with commercial polyolefins Hi-Fax (A63060) which is a polyethylene and Pro-Fax (No. 6523) which is a polypropylene, and various strength determinations made thereon. For comparative purposes, blends are also made of these polyolefins with Diene-35 which is a commercial polybutadiene and EPDM (Epsyn 3506) which is an ethylene-propylene copolymer. The respective results are reported below in Tables I, II and III.

TABLE I

| BLENDS WITH POLYETHYLENE | | | | | |
|---|---|---|---|---|---|
| Hi-Fax (A63060) | 100 | 90 | 80 | 90 | 90 |
| Block Polymer | | 10 | 20 | | |
| Diene-35 | | | | 10 | 20 |
| Tensil Strength, psi | 4,300 | 3,450 | 2,900 | 3,600 | 2,650 |
| Flexural Modulus, psi | 160,000 | 123,000 | 100,000 | 104,000 | — |
| Izod Impact, Notched (ft-lbs) | | | | | |
| 25°C | 1.5 | 10 | 15 | 2.0 | 2.9 |
| −20°C | 1.6 | 12.5 | 20 | 1.9 | 3.0 |
| −40°C | 1.7 | 12 | 24 | 2.1 | 3.4 |
| Heat Dist. Tempt. (°C) | 70 | 68 | 63 | 68 | 63 |

TABLE II

| BLENDS WITH POLYPROPYLENE | | | | |
|---|---|---|---|---|
| Pro-Fax (6523) | 100 | 90 | 80 | 90 |
| Block Polymer | | 10 | 20 | |
| Diene-35 | | | | 10 |
| Tensile Strength, psi | 5,250 | 4,250 | 3,600 | 3,900 |
| Flexural Strength, psi | 152,000 | 145,000 | 128,000 | 133,800 |
| Izod Impact, Notched (Ft-lbs.) | | | | |
| 25°C | 1.6 | 5.8 | 12.6 | 2.3 |
| −20°C | 0.5 | 1.1 | 2.1 | 1.2 |
| −40°C | 0.4 | 0.7 | 1.2 | 0.9 |
| Heat Dist. Tempt. (°C) | 125 | 110 | 106 | 101 |

TABLE III

| BLENDS WITH POLYETHYLENE | | | | |
|---|---|---|---|---|
| Hi-Fax (A63060) | 100 | 90 | 90 | 90 |
| Block Polymer | | 10 | | |
| Diene-35 | | | 10 | |
| EPDM "Epsyn 3506" | | | | 10 |
| Tensile Strength psi | 4,300 | 3,600 | 3,600 | 3,350 |
| Flexural Modulus, psi | 160,000 | 113,000 | 104,000 | 70,000 |
| Izod Impact Notched (ft-lbs) | | | | |
| 25°C | 1.4 | 10.0 | 2.0 | 14.0 |
| −40°C | 1.7 | 12.0 | 2.1 | 3.5 |
| Heat Dist. Temp. (°C) | 70 | 68 | 68 | 65 |

EXAMPLE IX

The hydrogenated isoprene blocks have an elastomeric or rubbery character and such a block retains this rubbery character even when it contains butadiene up to 50 weight percent. To illustrate this the procedure of Example VI is repeated except that the isoprene blend is replaced by a blend containing 10% butadiene, 15% isoprene and 75% hexane. When hydrogenated as in Example VIII the resultant seven block copolymer has four blocks of hydrogenated butadiene and three blocks of hydrogenated isoprene-butadiene copolymer and a rubbery character similar to the copolymer of Example VI.

While copolymers of even greater molecular weight may be used, the advantages of this invention are most useful with copolymers not exceeding a molecular weight of 1,000,000. Moreover, the preferred copolymers have 20–80% by weight of hydrogenated butadiene and 20–80% by weight of isoprene.

While certain features of this invention have been described in detail with respect to various embodiments thereof, it will, of course, be apparent that other modifications can be made within the spirit and scope of the invention and it is not intended to limit the invention to the exact details shown above except insofar as they are defined in the following claims:

The invention claimed is:

1. A hydrogenated block copolymer of improved permanent set and related properties comprising essentially at least 5–15 alternating blocks of hydrogenated butadiene and hydrogenated isoprene, which hydrogenated isoprene block may contain up to 50 percent by weight of hydrogenated butadiene, the hydrogenated butadiene portions representing 5–70 percent by weight and the hydrogenated isoprene portions representing 30–95 percent by weight, based on the total copolymer weight, each block of said copolymer being equivalent to a molecular weight of 1,000–100,000.

2. The copolymer of claim 1 in which there are at least seven said blocks.

3. The copolymer of claim 1 in which there are 5–11 of said alternating blocks.

4. The copolymer of claim 1 in which each block is equivalent to a molecular weight of 2,000–50,000.

5. The copolymer of claim 1 in which there is 20–80 percent by weight of hydrogenated isoprene.

6. A polyolefin composition of improved impact strength comprising 10–95 percent by weight of a polymer of an alpha-olefin having 2–4 carbon atoms and 5–90 percent by weight of the hydrogenated block copolymer of claim 1.

7. The composition of claim 6 in which said polyolefin is polyethylene.

8. The composition of claim 6 in which said polyolefin is polypropylene.

9. The composition of claim 6 which contains 15–60 percent by weight of said hydrogenated block copolymer.

10. The copolymer of claim 1 in which said hydrogenated isoprene blocks consist of hydrogenated isoprene homopolymer blocks.

11. The copolymer of claim 1 in which said hydrogenated isoprene blocks also contain hydrogenated butadiene up to 50 percent by weight of each said block.

* * * * *

UNITED STATES PATENT OFFICE
CERTIFICATE OF CORRECTION

Patent No. 3,985,826      Dated October 12, 1976

Inventor(s) Shingo Futamura

It is certified that error appears in the above-identified patent and that said Letters Patent are hereby corrected as shown below:

In Column 4, Line 60, "$-CH_2-CH_2-CH_2-3CH_2-$" should read -- $-CH_2-CH_2-CH_2-CH_2-$ --

Signed and Sealed this

Fourth Day of January 1977

[SEAL]

Attest:

RUTH C. MASON
*Attesting Officer*

C. MARSHALL DANN
*Commissioner of Patents and Trademarks*